United States Patent
Itou et al.

(10) Patent No.: US 8,238,204 B2
(45) Date of Patent: Aug. 7, 2012

(54) APPARATUS AND METHOD FOR MANAGING KEY IN LIBRARY APPARATUS

(75) Inventors: Yoshiharu Itou, Kawasaki (JP); Kinya Saito, Kawasaki (JP); Kenichi Utsumi, Kawasaki (JP); Reisuke Nakagawa, Kawasaki (JP); Hitomi Akiyama, Kawasaki (JP); Ichirou Sakuma, Kawasaki (JP); Hiroyasu Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 885 days.

(21) Appl. No.: 11/898,781

(22) Filed: Sep. 14, 2007

(65) Prior Publication Data
US 2008/0010396 A1  Jan. 10, 2008

Related U.S. Application Data (63) Continuation of application No. PCT/JP2005/004605, filed on Mar. 16, 2005.

(51) Int. Cl.
*G11B 21/08* (2006.01)
*G11B 7/085* (2006.01)

(52) U.S. Cl. ........ 369/30.27; 369/24.01; 369/30.01; 369/30.06; 369/30.15; 369/30.26; 709/209; 709/220; 709/221; 709/226; 709/215; 711/111; 711/161; 711/162; 711/114; 711/163; 700/218; 700/213; 700/214; 700/245; 380/277; 713/193; 713/165

(58) Field of Classification Search .......... 380/277
See application file for complete search history.

(56) References Cited

U.S. PATENT DOCUMENTS

| 5,583,654 | A |  | 12/1996 | Oguro |  |
|---|---|---|---|---|---|
| 7,877,603 | B2 | * | 1/2011 | Goodman et al. | 713/165 |
| 2002/0069173 | A1 |  | 6/2002 | Hori |  |
| 2004/0103292 | A1 | * | 5/2004 | Shirouzu | 713/193 |
| 2005/0071591 | A1 | * | 3/2005 | Goodman et al. | 711/163 |

FOREIGN PATENT DOCUMENTS

| EP | 0 600 467 A3 | 6/1994 |
|---|---|---|
| JP | 6-318373 | 11/1994 |
| JP | 10-214481 | 8/1998 |
| JP | 2002-117643 | 4/2002 |
| JP | 2002-236522 | 8/2002 |

OTHER PUBLICATIONS

English Abstract of Japanese Published Patent Application 6-318373.
Japanese Office Action mailed Nov. 10, 2009 in corresponding Japanese Patent Application 2007-507979.
International Search Report (PCT/ISA/210) of the International Application PCT/JP2005/004605 (mailed on Apr. 26, 2005).

* cited by examiner

*Primary Examiner* — Nathan Flynn
*Assistant Examiner* — Bryan Wright
(74) *Attorney, Agent, or Firm* — Fujitsu Patent Center (57) ABSTRACT

In order to facilitate the management of the hardware key of a library apparatus employing the LTO system, a write function of a noncontact memory (CM: cartridge memory) contained in an LTO tape cartridge is implemented in a medium carrying mechanism part of the library apparatus, and during an insertion to a tape drive, the IDs unique to a library control part and to the medium carrying mechanism part are recorded in the non-contact memory and utilized as the hardware key of an encrypting apparatus. The hardware key written once is overwritten (erased) during an ejection, thereby preventing leakage of key information.

6 Claims, 12 Drawing Sheets

APPARATUS AND METHOD FOR MANAGING KEY IN LIBRARY APPARATUS

CROSS REFERENCE TO RELATED APPLICATION

This application is a continuation of PCT application of PCT/JP2005/004605, which was filed on Mar. 16, 2005.

BACKGROUND OF THE INVENTION

1. Field of the Invention

The present invention relates to a managing apparatus and method of a hardware key in a library apparatus employing LTO (Linear Tape-Open) technology, and in particular to a managing apparatus and method of a key for facilitating the management of hardware keys (antitheft protection of keys) and for improving the usability of a library apparatus employing the LTO technology.

2. Description of the Related Art

In a case in which data to be recorded in a tape medium is encrypted using an encryption apparatus, a method is conventionally known for using a unique ID assigned to an apparatus encrypting the data as a hardware key.

Figure 1:
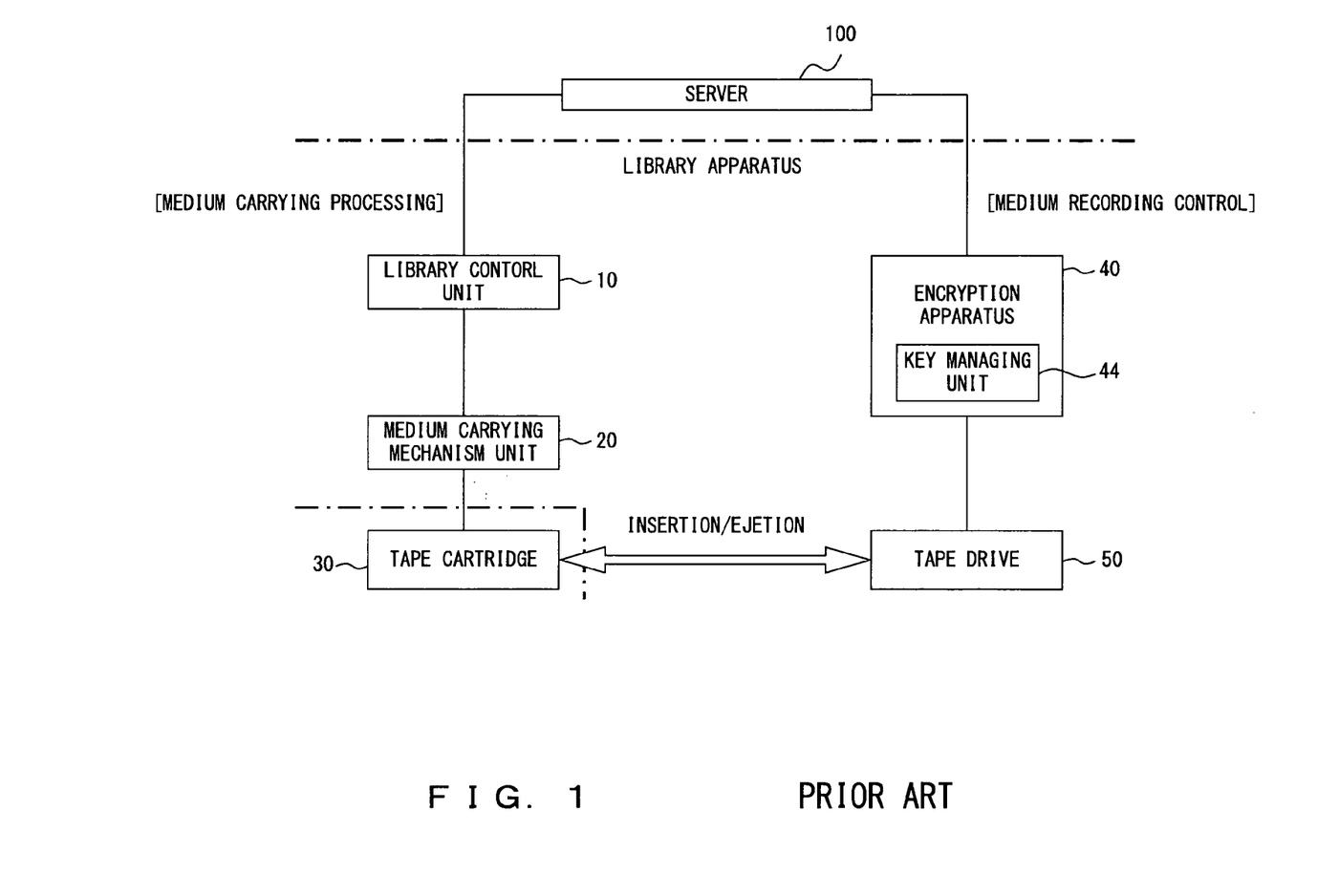
FIG. 1 is a block diagram showing an overview of a configuration of a key managing apparatus in a conventional library apparatus employing the LTO technology.

FIG. 1 is a block diagram showing an overview of a configuration of a key managing apparatus in a conventional library apparatus employing the LTO technology. Generally, in a library apparatus employing the LTO technology, the function can be divided into a medium carrying processing side and a medium recording control side as shown in FIG. 1. The configuration of the conventional library apparatus employing the LTO technology shown in FIG. 1 comprises a library control unit 10 and a medium carrying mechanism unit 20 in the medium carrying processing side and an encryption apparatus having a key managing unit 44 and a tape drive 50 in the medium recording control side. A tape cartridge 30 having a CM (Cartridge Memory) is carried by the medium carrying mechanism unit 20, is next mounted to a prescribed position of the tape driver 50, is subsequently written/read, and afterward is ejected to the original position. A server 100 causes the library apparatus to issue a write/read instruction and to perform writing/reading of data, on the basis of a write/read request from a host in an upper level not shown in the drawings.

Figure 2:
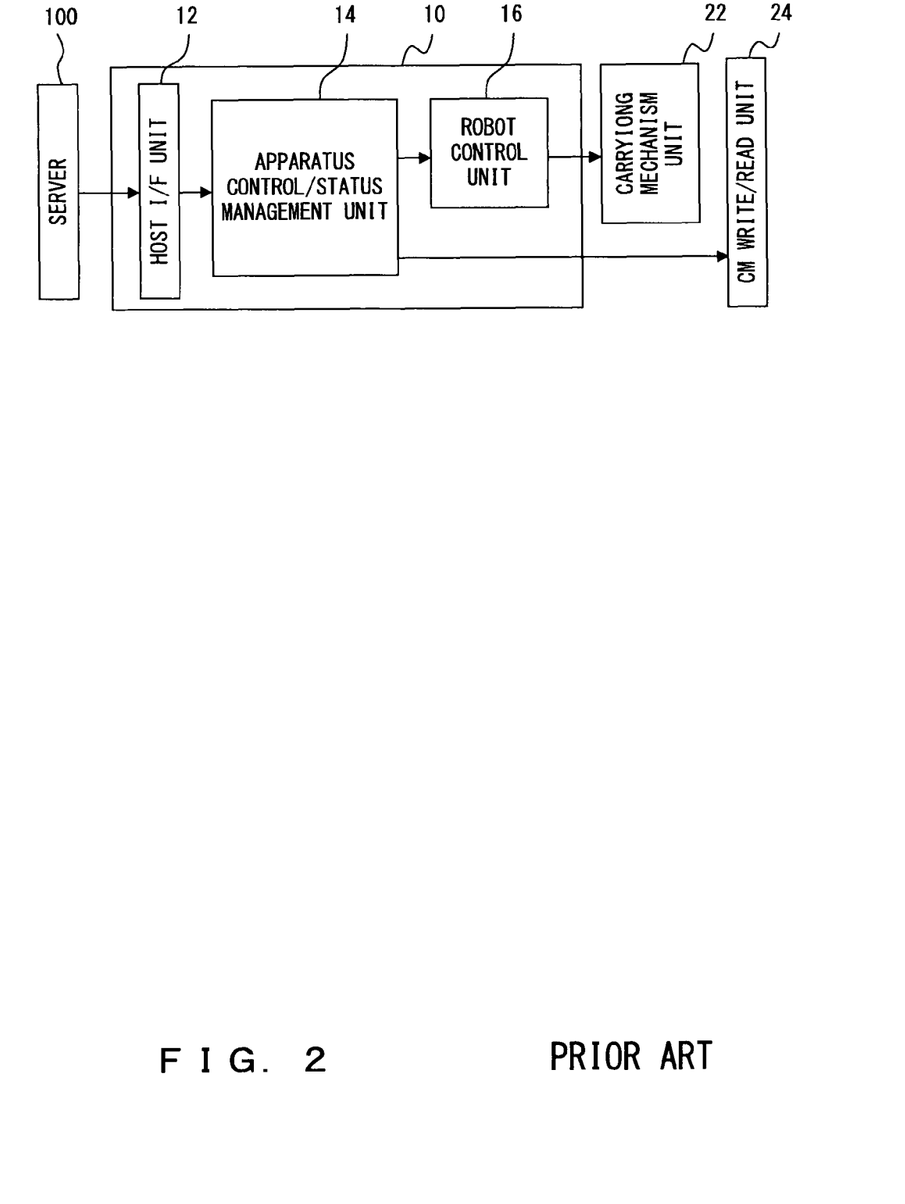
FIG. 2 is a block diagram showing the configuration of the library control unit shown in FIG. 1.

FIG. 2 is a block diagram showing the configuration of the library control unit shown in FIG. 1. In FIG. 2, a host interface (I/F) unit 12 communicates with a host in an upper level (or the server 100) not shown in the drawing according to a prescribed interface specification. A command issued from the upper level host not shown in the drawing is interpreted in the host I/F unit 12, and the interpretation is sent to the apparatus control/status management unit 14. For each command issued from the upper level host not shown in the drawing and processed/executed in the library apparatus, the host I/F unit 12 receives the result from the apparatus control/status management unit 14, and responds to the upper level host (or the server 100) not shown in the drawing.

The apparatus control/status management unit 14 processes the command received via the host I/F unit 12 on the basis of the status information and the setting information of an apparatus that the apparatus control/status management unit 14 manages, and issues operation instructions to each of the mechanism units (a robot control unit 16 and a CM write/read unit 24) explained later. The apparatus control/status management unit 14 informs the host I/F unit 12 of the operation result of each of the mechanism units (the robot control unit 16 and the CM write/read unit 24), and updates the status information of the apparatus control/status management unit 14.

The robot control unit 16 performs drive and stop controls of a robot on the basis of robot operation instructions issued by the apparatus control/status management unit 14.

Figure 3:
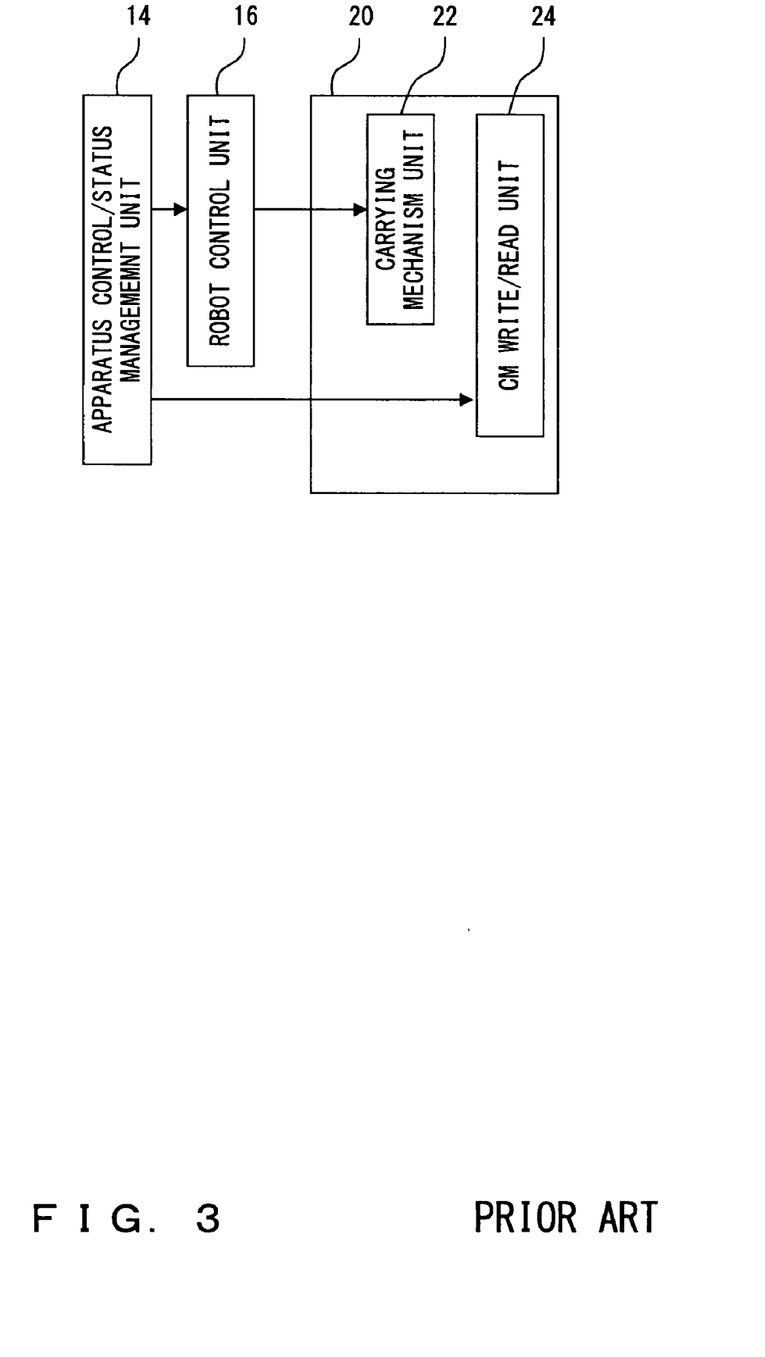
FIG. 3 is a block diagram showing the configuration of the medium carrying mechanism unit shown in FIG. 1.

FIG. 3 is a block diagram showing the configuration of the medium carrying mechanism unit shown in FIG. 1. In FIG. 3, a carrying mechanism unit 22 grips and carries the tape cartridge 30 on the basis of instructions from the apparatus control/status management unit 14 of the library apparatus 10.

The CM write/read unit 24 performs read and write operations from and to the CM (Cartridge Memory) stored in the tape cartridge in the medium carrying mechanism unit.

Patent Document 1 should be referred to for an example of the tape cartridge and the CM cartridge memory here. The CM cartridge memory is a non-contact type IC memory that can store the mounting history of the tape cartridge, recording data volume, and statistical information such as error information.

Figure 4:
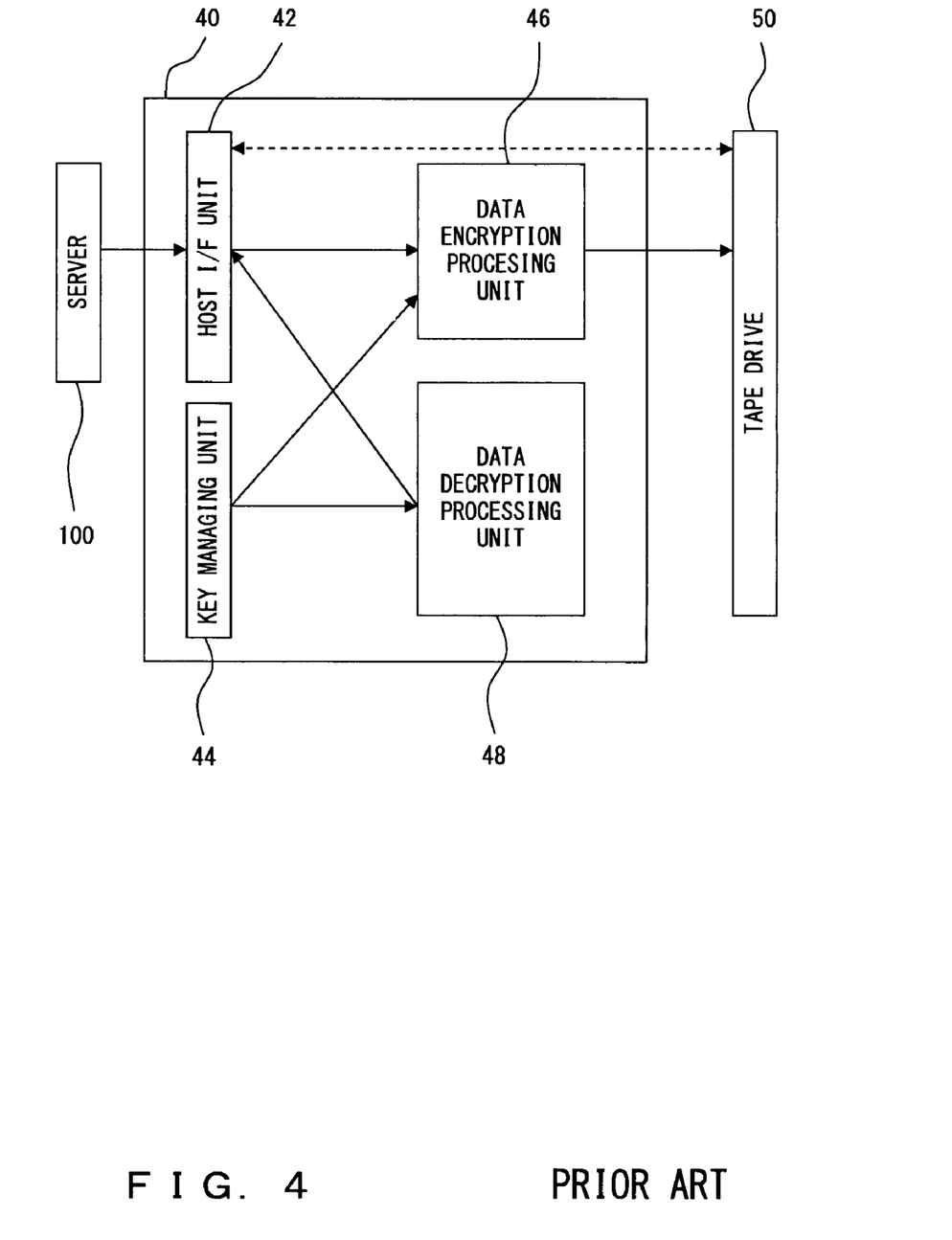
FIG. 4 is a block diagram showing a configuration of the encryption apparatus shown in FIG. 1.

FIG. 4 is a block diagram showing a configuration of the encryption apparatus shown in FIG. 1. In FIG. 4, the host I/F unit 42 communicates with the upper level host (or the server 100) not shown in the drawing according to a prescribed interface specification.

The key managing unit 44 manages encryption key information for encrypting data and provides appropriate key information in response to requests from a data encryption processing unit 46 and a data decryption processing unit 48. For encryption key information, an ID that is unique to the encryption apparatus corresponding to each tape drive is used.

The data encryption processing unit 46 identifies the command received via the host I/F unit 42, and when the data is to be encrypted, obtains key information for encryption from the key managing unit 44 and performs data encryption processing.

The data decryption processing unit 48 identifies data sent from the tape drive 50, and when the data is to be decrypted, obtains key information for decryption from the key managing unit 44, and performs data decryption processing.

Figure 5:
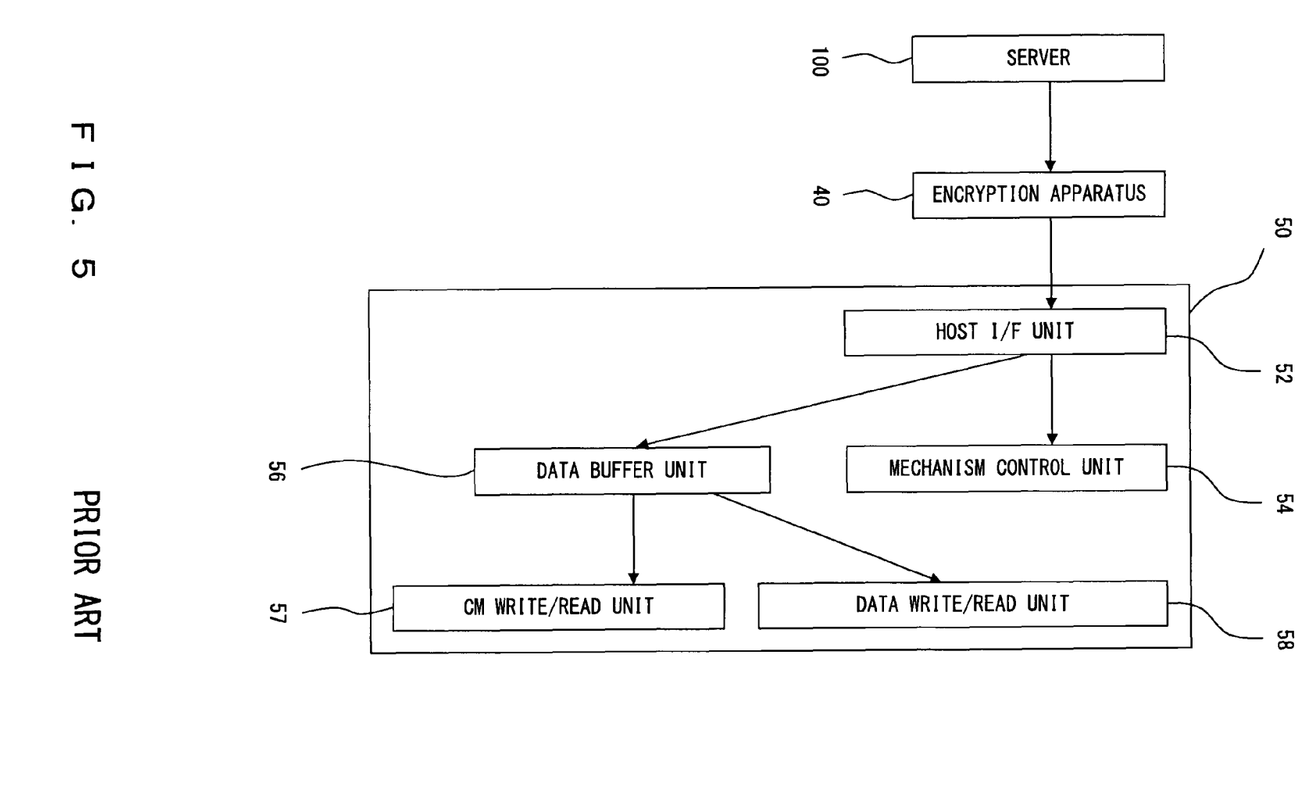
FIG. 5 is a block diagram showing the configuration of the tape drive shown in FIG. 1.

FIG. 5 is a block diagram showing the configuration of the tape drive shown in FIG. 1. In FIG. 5, a host I/F unit 52 communicates with the upper level host (the server 100 or the encryption apparatus 40) not shown in the drawing according to a prescribed interface specification.

A mechanism control unit 54 performs run and stop control of the tape and mounting/ejecting processing of the tape cartridge according to commands received via the host I/F unit 52.

The data buffer unit 56 temporarily accumulates written/read data in order to increase as much as possible the data volume exchanged with a host not shown in the drawing and the volume written in a magnetic tape.

The CM write/read unit 57 exchanges processed data of the in-process tape cartridge and statistical information such as the error rate with the CM cartridge memory housed in the tape cartridge.

The data read/write unit 58 performs data writing to the tape cartridge and data reading from the tape cartridge.

Figure 6:
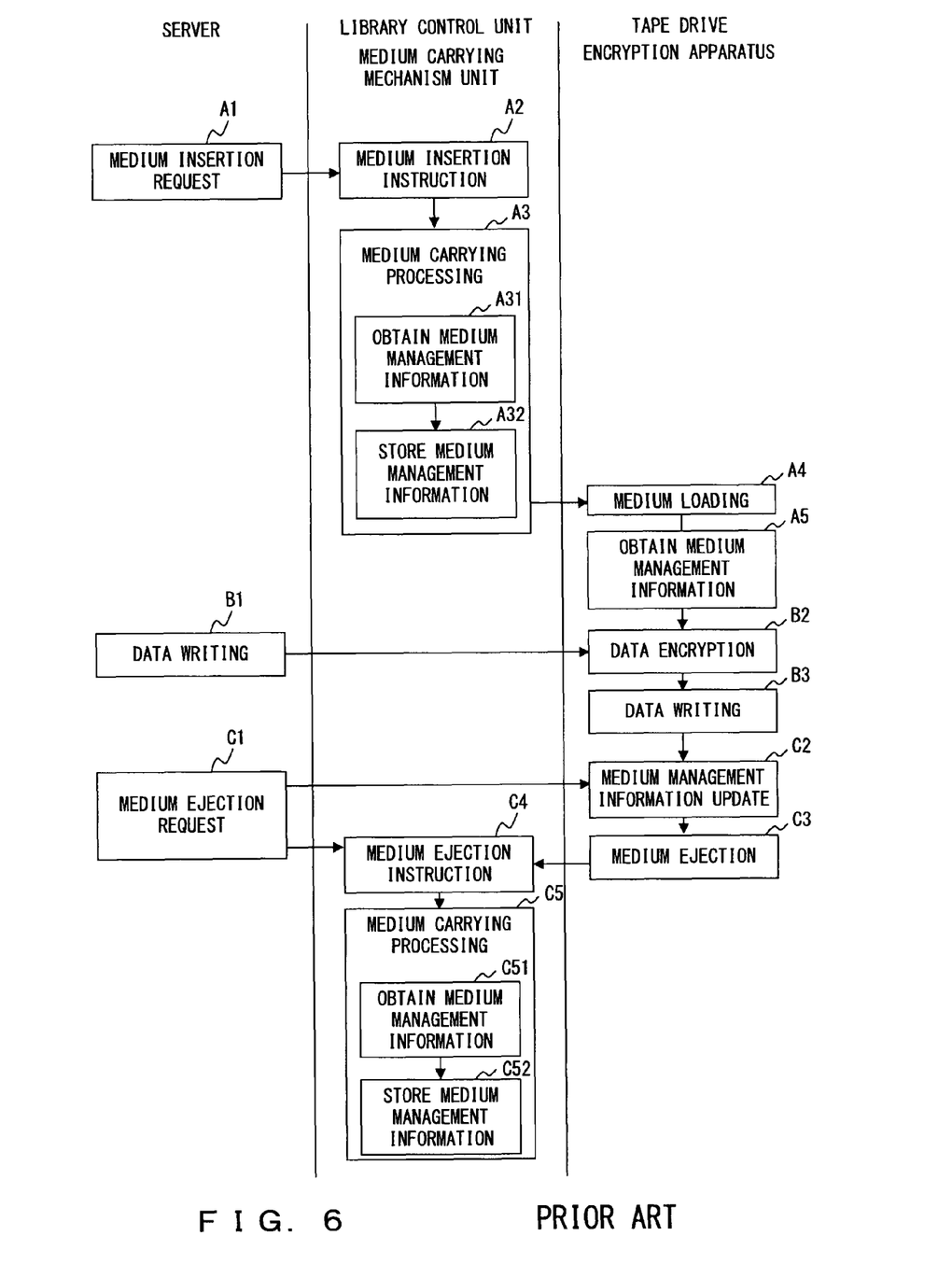
FIG. 6 is a diagram showing a sequence between the server (including the upper level host), the library control unit and medium carrying mechanism unit, and the tape drive and the encryption apparatus.
Figure 7:
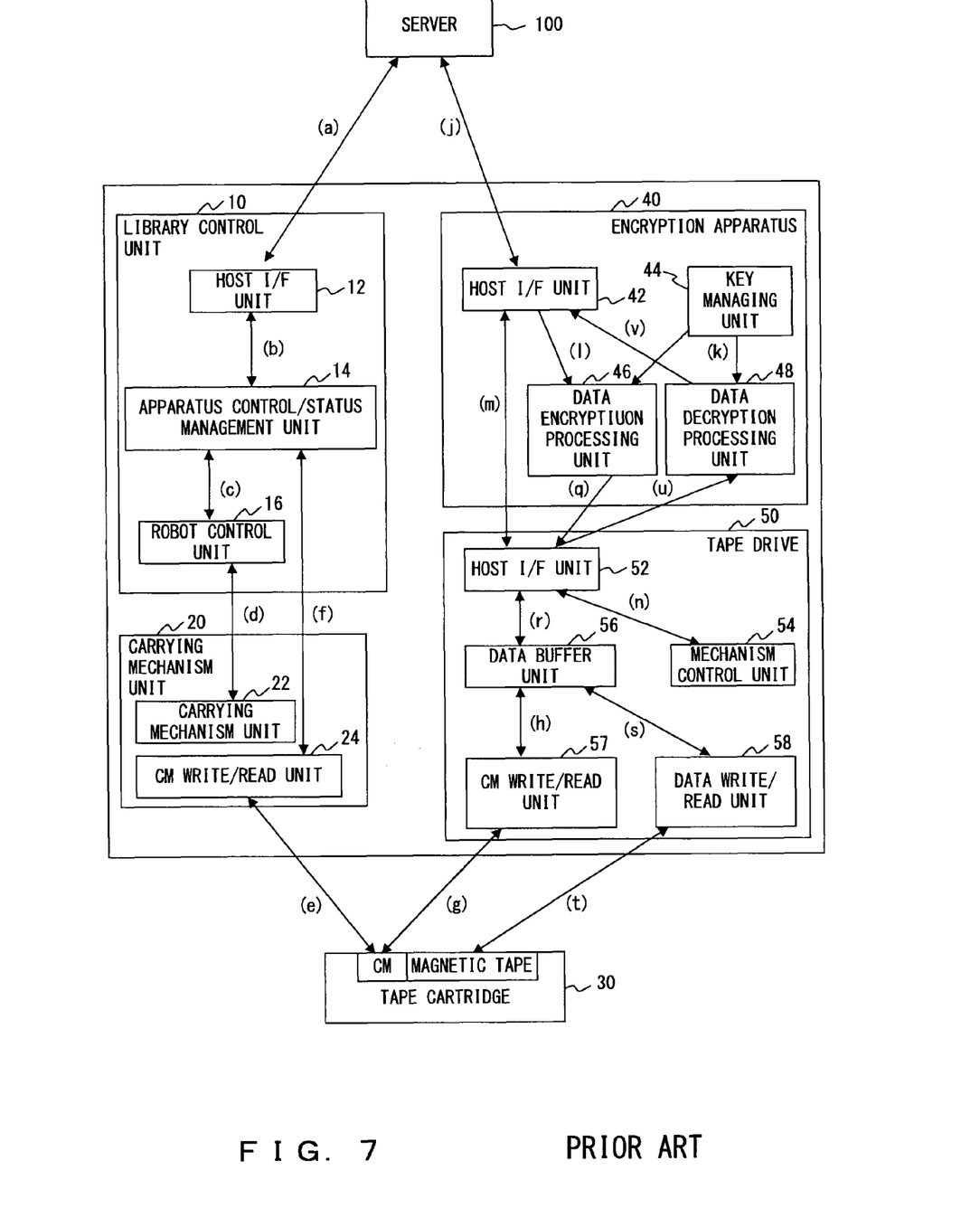
FIG. 7 is a diagram explaining the flow of information of the key managing apparatus in the conventional library apparatus employing the LTO technology.

The operation of the key managing apparatus in the conventional library apparatus employing the LTO technology with the configuration provided above is set forth with reference to FIG. 6 and FIG. 7. FIG. 6 is a diagram showing a sequence between the server (including the upper level host), the library control unit and medium carrying mechanism unit, and the tape drive and the encryption apparatus, and FIG. 7 is a diagram explaining the flow of information of the key managing apparatus in the conventional library apparatus employing the LTO technology. In FIG. 6 and FIG. 7, the server 100 issues a medium insertion request (command) (a) to the library control unit 10 (A1). The library control unit 10 issues a medium insertion instruction ((b)-(d)) to the medium carrying mechanism unit 20 (A2). The medium carrying mechanism unit 20 performs medium carrying processing (A3). In the medium carrying processing, medium management information is obtained (e) from the CM cartridge memory of the tape cartridge 30 (A31), and the medium management information is updated and stored (f) in the library control unit 10 (A32). Meanwhile, the tape drive 50 loads (n) a medium (A4). The tape drive 50, next, obtains (g) the medium management information in the CM write/read unit 57 (A5).

Afterward, the server 100 instructs (j) data writing to the encryption apparatus 40 (B1). Although the example shown in the drawing describes a data writing instruction, it is obvious that the instruction can also be a data reading instruction. The encryption apparatus 40 obtains the key information (k) from the key managing unit 44, and performs encryption of the data (q) (B2). In the tape drive 50, the encrypted data is written in the magnetic tape unit of the tape cartridge 30 ((r), (s), (t)) (B3).

In response to the termination of the writing of the encrypted data to the tape cartridge 30 ((r), (m), (j)), the server 100 issues a medium ejection request (command) ((j), (m), (n)) to the tape drive 50 (C1). The tape drive 50 updates the medium management information (g) in the CM write/read unit 57 (C2). The tape drive 50 ejects (n) the medium (C3). Meanwhile, the medium ejection request (command) from the server 100 (C1) is also issued to the library control unit 10 at the same time ((a), (b)), and when the medium ejection ends in the tape drive 50 ((n), (m), (j), (a), (b)), the library control unit 10 issues a medium ejection instruction ((c), (d)) to the medium carrying mechanism unit 20 (C4). The medium carrying mechanism unit 20 performs the medium carrying processing (C5). In the medium carrying processing, the medium management information is obtained (e) from the CM cartridge memory of the tape cartridge 30 (C51), and the medium management information is updated and stored (f) in the library control unit 10 (C52).

As described above, in a case in which the key managing apparatus in the conventional library apparatus employs the LTO technology, one encryption apparatus is needed for one tape drive, and in a library apparatus using a great number of tape drives (in general, a library apparatus employing the LTO technology can comprise 30-40 tape drives), a great number of hardware keys have to be managed (antitheft protection of the keys), and the management of the hardware keys thus becomes very complicated, which is a problem.

Because backup software generally used in open systems (a computer system using an OS whose specifications have been released to the public such as Windows™, and UNIX™) does not specify a tape drive for each normally performed job but uses any empty tape drive, there is a problem such that when an ejected tape medium is taken out and used with other computers, identification of a hardware key required for decryption is difficult.
Patent Document 1:
    Japanese Patent Application Publication No. 2002-117643

SUMMARY OF THE INVENTION

The present invention has been created to solve the above problems, and it is an object of the present invention to provide an apparatus and a method for key management in the library apparatus that facilitates management of hardware keys of the library apparatus employing the LTO technology.

The present invention comprises key information writing means for writing encryption key information in non-contact type memory stored in a tape cartridge in a medium carrying mechanism unit, writes the key information to the non-contact type memory by the key information writing means when the tape cartridge is inserted and carried to the tape drive, and obtains encryption/decryption key information from the non-contact type memory.

According to the present invention, because writing of encryption/decryption key information is performed when the tape cartridge is inserted and carried to the tape drive, key management can be facilitated, and in addition, it is possible to improve the usability of a library apparatus employing the LTO technology.

DESCRIPTION OF THE PREFERRED EMBODIMENTS

Figure 8:
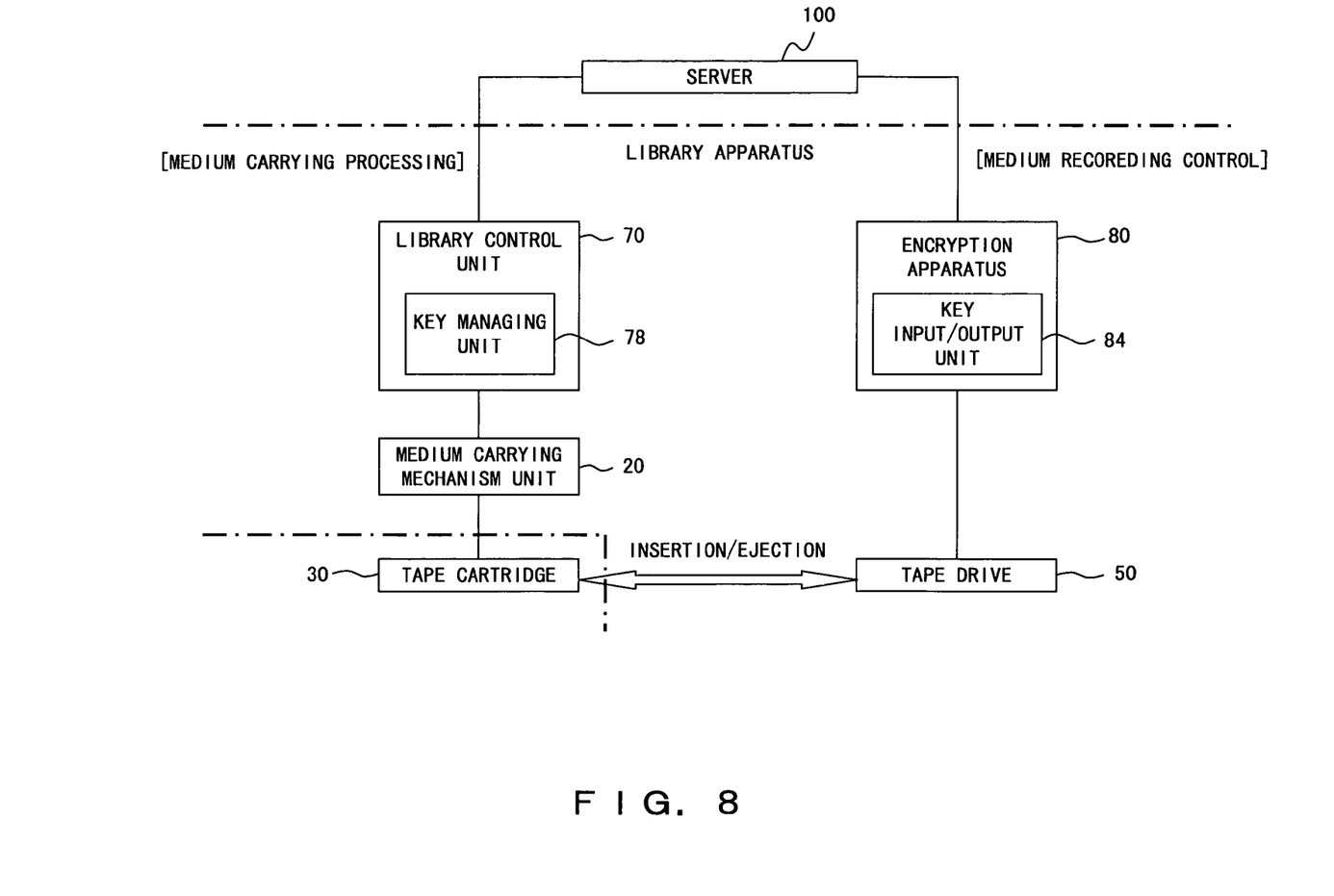
FIG. 8 is a block diagram showing an overview of a configuration of the key managing apparatus of the library apparatus employing the LTO technology according to the present invention.

FIG. 8 is a block diagram showing an overview of a configuration of the key managing apparatus of the library apparatus employing the LTO technology according to the present invention. As described above, in the library apparatus employing the LTO technology, the functioning can be divided into a medium carrying processing side and a medium recording control side. The configuration of the library apparatus according to the present invention shown in FIG. 8 comprises a library control unit 70 having a key managing unit 78 and the medium carrying mechanism unit 20 on the medium carrying processing side, and an encryption apparatus 80 having a key input/output unit 84 and a tape drive 50 on the medium recording control side. The tape cartridge 30 having CM (Cartridge Memory) is carried by the medium carrying mechanism unit 20, is next mounted to a prescribed position of the tape drive 50, is subsequently written/read, and afterward, is ejected to the original position. A server 100 causes the library apparatus to issue a write/read instruction and to perform writing/reading of data on the basis of a write/read request from the upper level host not shown in the drawing. Note that because the medium carrying mechanism unit 20 is the same as the one shown in FIG. 3 and the tape drive 50 is the same as the one shown in FIG. 5, the explanations for each are omitted in the following description.

Figure 9:
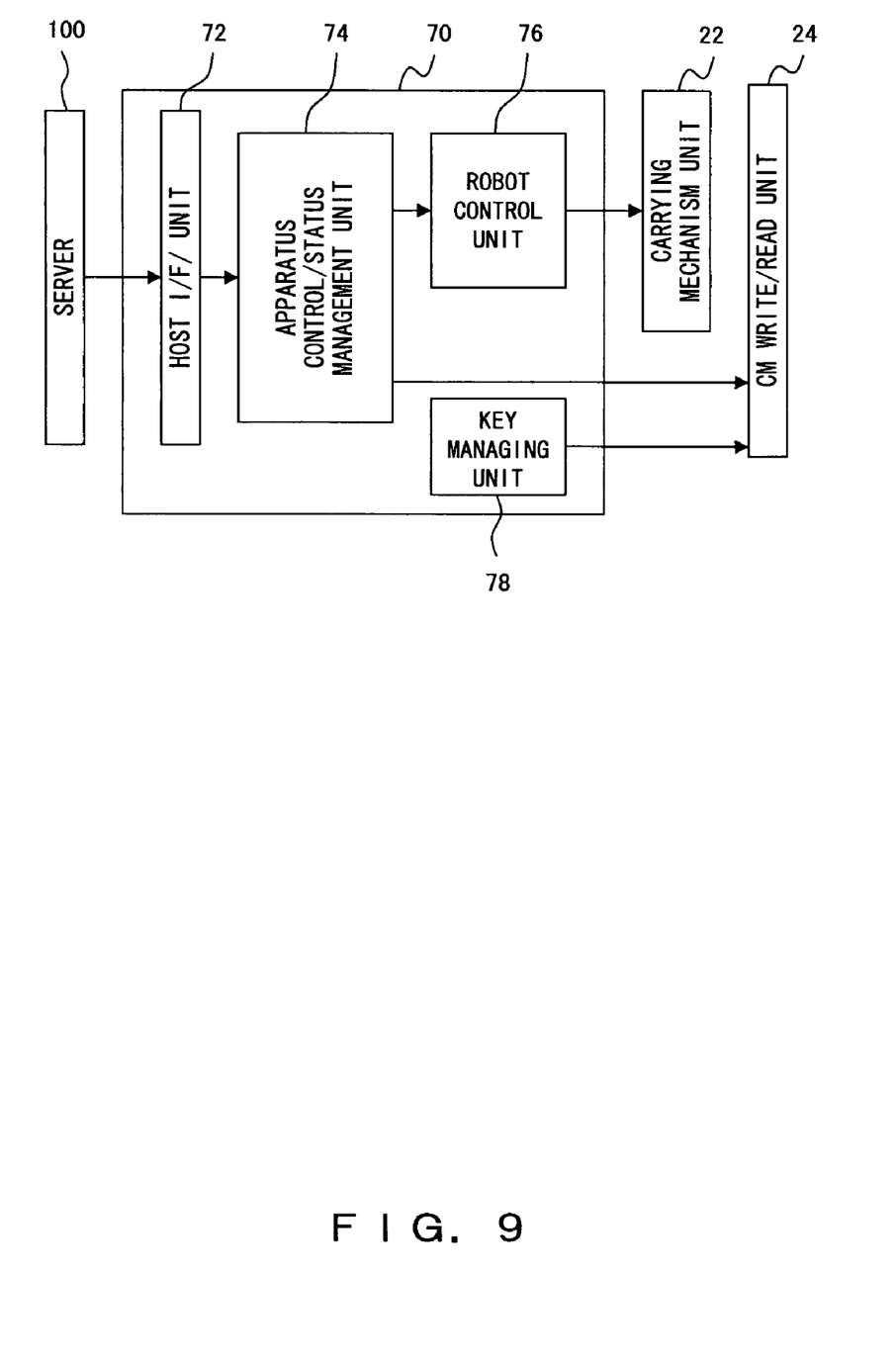
FIG. 9 is a block diagram showing the configuration of the library control unit shown in FIG. 8.

FIG. 9 is a block diagram showing the configuration of the library control unit shown in FIG. 8. In FIG. 9, a host interface (I/F) unit 72 communicates with the upper level host (or the server 100) not shown in the drawing according to a prescribed interface specification. The command issued from the upper level host not shown in the drawing is interpreted in the host I/F unit 72, and the interpretation is sent to an apparatus control/status management unit 74. For each command issued from the upper level host not shown in the drawing and processed/executed in the library apparatus, the host I/F unit 72 receives the result from the apparatus control/status management unit 74, and responds to the upper level host (or the server 100) not shown in the drawing.

The apparatus control/status management unit 74 processes the command received via the host I/F unit 72 on the basis of the status information and the setting information of an apparatus that the apparatus control/status management unit 74 manages, and issues an operation instruction to each of the mechanism units (a robot control unit 76 and the CM write/read unit 24) explained later. The apparatus control/status management unit 74 informs the host I/F unit 72 of the operation result of each of the mechanism units (the robot control unit 76 and the CM write/read unit 24), and updates the status information of the apparatus control/status management unit 74.

The robot control unit 76 performs drive and stop controls of a robot on the basis of a robot operation instruction issued by the apparatus control/status management unit 74.

The key managing unit 78 manages encryption key information for encrypting data, and provides appropriate key information to the CM write/read unit 24 of the medium carrying mechanism unit. In FIG. 9, an ID that is unique to the library control unit can be used as a hardware key. Note that in FIG. 9, the site for retaining the encryption key information and the site for managing the encryption key information are the same in the key managing unit 78; however, as long as the site for managing the encryption key information is determined to be in the key managing unit 78 of the library control unit 70, the site for retaining the key information can be provided in any unit in the library apparatus other than the library control unit, including in the medium carrying mechanism unit 20 or in its neighboring dedicated installation site (not shown in the drawing). In such a case, a new transmission line for transferring the key information to the key managing unit 78 of the library control unit 70 from the site for retaining the key information is required. In such a manner, an ID unique to the medium carrying mechanism unit or an ID unique to the dedicated installation site near the medium carrying mechanism unit can be used as a hardware key, and the key managing unit 78 of the library control unit 70 can manage all of the transferred encryption key information.

Figure 10:
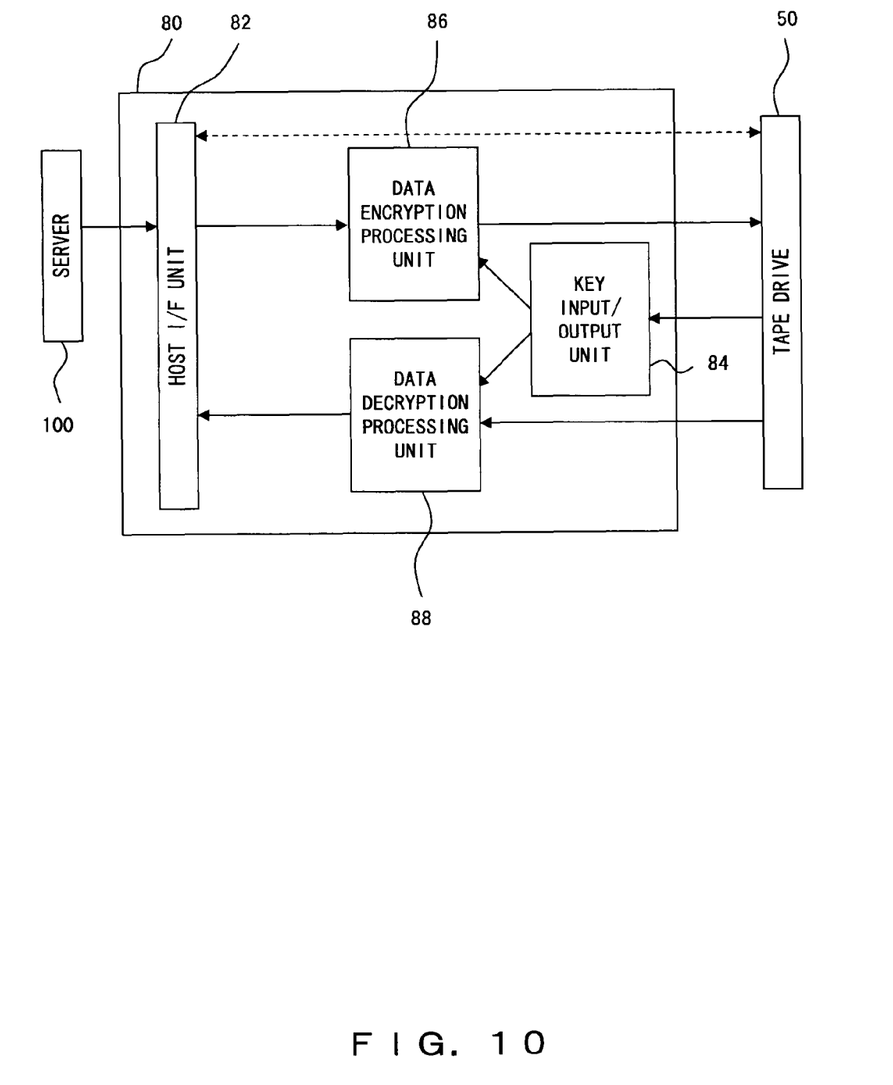
FIG. 10 is a block diagram showing the configuration of the encryption apparatus shown in FIG. 8.

FIG. 10 is a block diagram showing the configuration of the encryption apparatus shown in FIG. 8. In FIG. 10, the host I/F unit 82 communicates with the upper level host (or the server 100) not shown in the drawing according to a prescribed interface specification.

The key input/output unit 84 is for temporarily writing key information managed by the key managing unit 78 of the library control unit 70 and is provided to the CM write/read unit 24 of the medium carrying mechanism unit 20 in non-contact type memory (cartridge memory: CM) stored in the tape cartridge 30 and for temporarily storing the key information so that the key information is read by the CM write/read unit 57 of the tape drive 50 and is used as the key information for data encryption/decryption. Further, the key input/output unit 84 provides appropriate key information in response to requests from the data encryption processing unit 86 or the data decryption processing unit 88.

The data encryption processing unit 86 identifies the command received via the host I/F unit 82, obtains key information for encryption from the key input/output unit 84 when the data is a subject of encryption, and performs data encryption processing.

The data decryption processing unit 88 identifies data sent from the tape drive 50, obtains key information for decryption from the key input/output unit 84 when the data is a subject of decryption, and performs data decryption processing.

Figure 11:
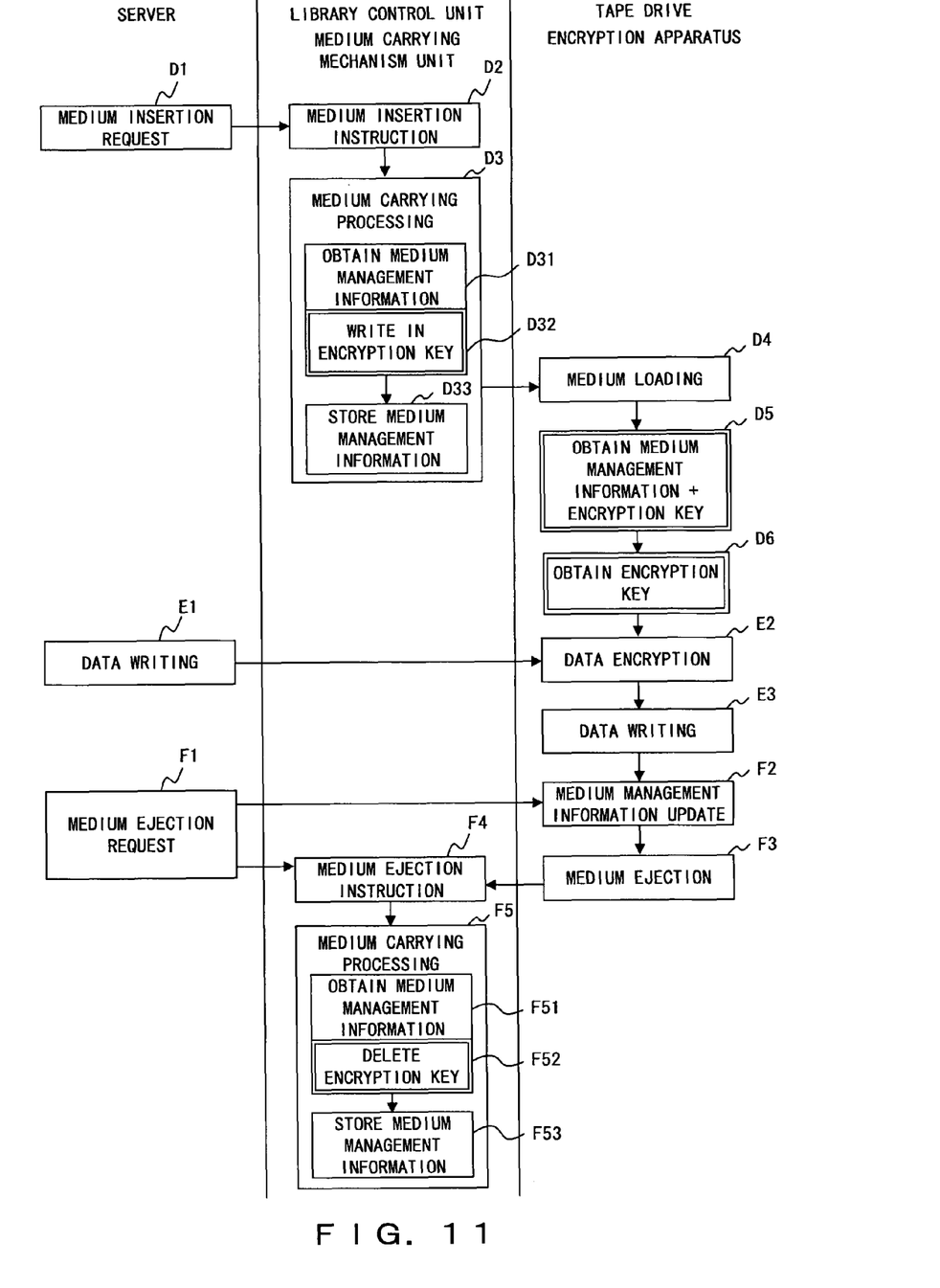
FIG. 11 is a diagram showing a sequence between the server (including the upper level host), the library control unit and the medium carrying mechanism unit, and the tape drive and the encryption apparatus.
Figure 12:
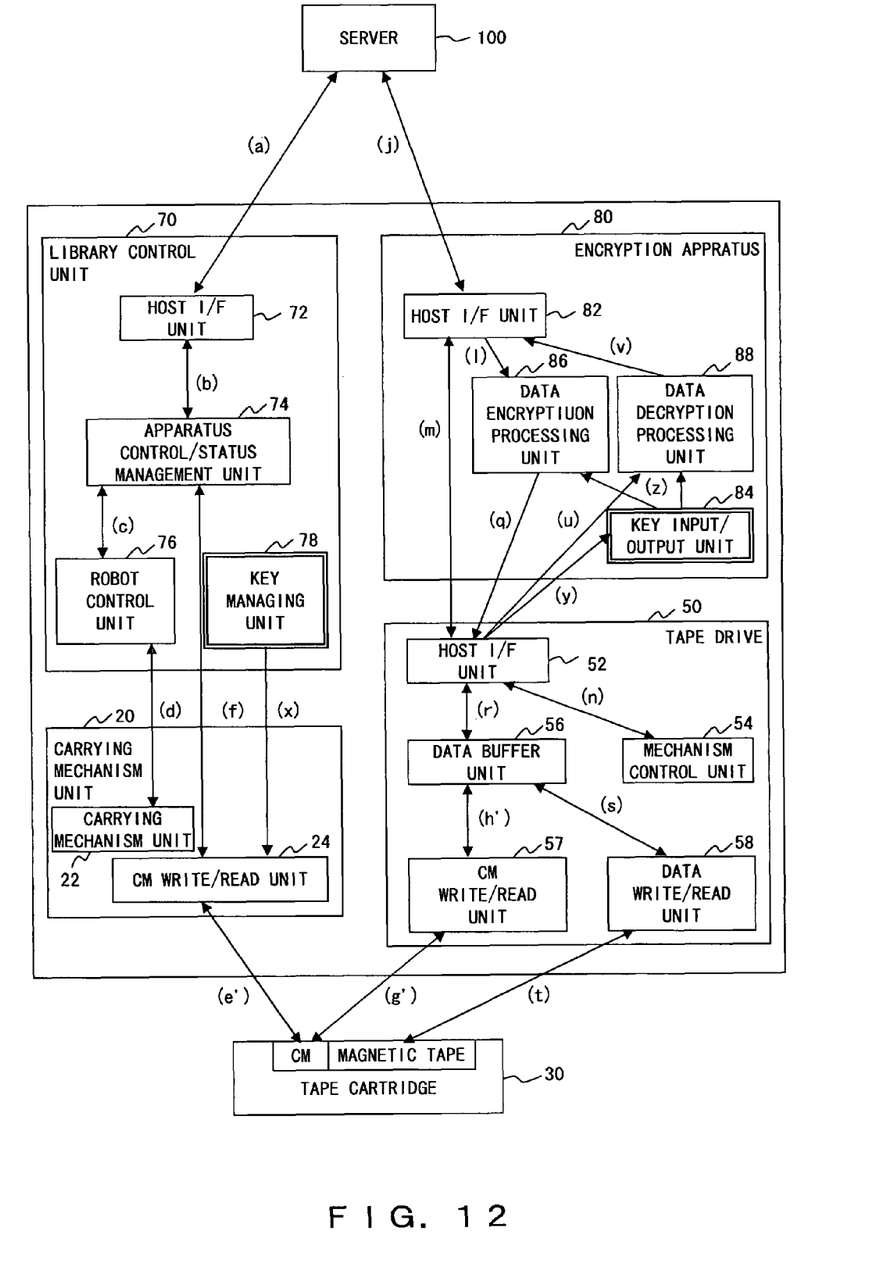
FIG. 12 is a diagram explaining the flow of information of the key managing apparatus in the library apparatus employing the LTO technology according to the present invention.

The operation of the key managing apparatus in the library apparatus employing the LTO technology according to the present invention having the configuration described above is set forth with reference to FIG. 11 and FIG. 12. FIG. 11 is a diagram showing a sequence between the server (including the upper level host), the library control unit and the medium carrying mechanism unit, and the tape drive and the encryption apparatus, and FIG. 12 is a diagram explaining the flow of information of the key managing apparatus in the library apparatus employing the LTO technology according to the present invention. In FIG. 11 and FIG. 12, the server 100 issues a medium insertion request (command) (a) to the library control unit 70 (D1). The library control unit 70 issues a medium insertion instruction ((b)-(d)) to the medium carrying mechanism unit 20 (D2). The medium carrying mechanism unit 20 performs medium carrying processing (D3). In the medium carrying processing, medium management information is obtained from the CM cartridge memory of the tape cartridge 30 (D31), and the encryption key information is written in the CM cartridge memory of the tape cartridge 30 from the key managing unit 78 via the CM write/read unit 24 ((x), (e')) (D32). Additionally, the medium management information is updated and stored (f) in the library control unit 70 (D33). Meanwhile, the tape drive 50 loads (n) a medium (D4). The tape drive 50, next, obtains the medium management information in the CM write/read unit 57 and obtains the encryption key information ((g'), (h')) at the same time (D5). An input/output unit 84 of the encryption apparatus 80 obtains the encryption key from the tape drive 50 ((r), (y)), and retains the key (D6).

Afterward, the server 100 instructs the encryption apparatus 80 to write data (j) (E1). Although the example in the drawing describes a data writing instruction, it is obvious that the instruction can be a data reading instruction. The encryption apparatus 80 obtains the key information from the key input/output unit 84 (z), and performs data encryption (q) (E2). In the tape drive 50, writing of the encrypted data is written in the magnetic tape unit of the tape cartridge 30 ((r), (s), (t)) (E3).

In response to the writing of the encrypted data in the tape cartridge 30 ((r), (m), (j)), the server 100 issues a medium ejection request (command) ((j), (m), (n)) to the tape drive 50 (F1). The tape drive 50 updates the medium management information (g') in the CM write/read unit 57 (F2). The tape drive 50 ejects (n) the medium (F3). Meanwhile, the medium ejection request (command) from the server 100 (F1) is also issued to the library control unit 70 at the same time ((a), (b)), and when the medium ejection ends in the tape drive 50 ((n), (m), (j), (a), (b)), the library control unit 10 issues a medium ejection instruction ((c), (d)) to the medium carrying mechanism unit 20 (F4). The medium carrying mechanism unit 20 performs the medium carrying processing (F5). In the medium carrying processing, the medium management information is obtained from the CM cartridge memory of the tape cartridge 30 (F51), and encryption key information stored in the CM cartridge memory of the tape cartridge 30 is deleted (overwritten) ((x), (e')) via the CM write/read unit 24 (F52). Afterwards, the medium management information is updated and stored (f) in the library control unit 70 (F53).

The key managing apparatus in the library apparatus employing the LTO technology according to the present invention, as described above, has an effect such that even in a library apparatus using a great number of tape drives (in general, a library apparatus employing the LTO technology can comprise 30-40 tape drives), any complication such as managing a great number of hardware keys (antitheft protection of the key) can be eliminated because a key managing unit manages all of the encryption key information.

There is another effect such that even when using an empty tape drive without specifying the tape drive for each job by backup software and when taking out the ejected tape medium and using it with other computers, because the all of the encryption key information is managed by a key managing unit, identification of a hardware key is no longer required.

The present invention, because an encryption key is transferred to and from a free usage area of a non-contact type IC memory (CM: Cartridge Memory) that stores the mounting history of the tape cartridge, recording data volume, and statistical information such as error information of a tape cartridge, is significantly useful for the utilization of backup software in a computer system using an OS whose specifications have been released to the public, such as Windows™ and UNIX™) and for the antitheft protection of the key.

What is claimed is:

1. A key managing apparatus in a library apparatus comprising:
    a library control unit to send a medium carrying instruction to a medium carrying mechanism unit;
    a key managing unit to store hardware key information and to manage the hardware key information in the library control unit;
    a key information writing unit to write the hardware key information in non-contact type memory stored in a tape cartridge in the medium carrying mechanism unit, after the medium carrying instruction is sent and before the tape cartridge is loaded into a tape drive from the medium carrying mechanism unit, and
    a key information obtaining unit to obtain the hardware key information from the non-contact type memory in the tape cartridge,
    wherein the hardware key information is an ID unique to the library control unit, an ID unique to the medium carrying mechanism unit, or an ID of a dedicated installation site neighboring the medium carrying mechanism unit.

2. The key managing apparatus in the library apparatus according to claim 1, wherein
    the key information writing unit deletes the hardware key information by overwriting when the tape cartridge is ejected and carried from the tape drive.

3. The key managing apparatus in the library apparatus according to claim 1,
    wherein the key managing unit manages the hardware key information in an integrated manner as a site managing key information.

4. A key managing method in a library apparatus employing an LTO technology, comprising:
    writing/rewriting hardware key information to non-contact type memory stored in a tape cartridge after a medium carrying instruction is sent to a medium carrying mechanism unit and before the tape cartridge is loaded into a tape drive from the carrying mechanism unit;
    and using the hardware key information as encryption/decryption key information, wherein the encryption/decryption key information in the non-contact type memory of the tape cartridge is obtained by the tape drive using a non-contact memory type read unit in the tape drive;
    wherein the key information is an ID unique to the library control unit, an ID unique to the medium carrying mechanism unit, or an ID of a dedicated installation site neighboring the medium carrying mechanism unit.

5. The key managing method in the library apparatus according to claim 4, wherein the hardware key information is deleted by rewriting when the tape cartridge is ejected and carried from the tape drive.

6. The key managing method in the library apparatus according to claim 4, further comprising separating a site retaining key information from a site managing key information, and establishing a site for managing key information in a medium carrying control unit.

\* \* \* \* \*